United States Patent [19]
Marchese et al.

[11] 3,748,697
[45] July 31, 1973

[54] CLAMP ASSEMBLY FOR HOSE, PIPE AND LIKE ARTICLES

[76] Inventors: Louie J. Marchese, 5116 N. 17th St., Phoenix, Ariz. 85016; Robert A. Hildebrandt, P.O. Box 42, Queen Creek, Ariz. 85242

[22] Filed: Dec. 20, 1971

[21] Appl. No.: 209,593

[52] U.S. Cl. .......................................... 24/19, 24/20
[51] Int. Cl. ............................................ B65d 63/02
[58] Field of Search ............... 24/19, 20 TT, 20 EE, 24/23 EE, 23 R

[56] References Cited
UNITED STATES PATENTS
2,907,086  10/1959  Ord ........................................ 24/19
3,293,709  12/1966  Holton ............................... 24/20 TT
2,870,503  1/1959   McAneny ........................... 24/23 B
1,261,221  4/1918   Dutcher ............................. 24/20 TT Primary Examiner—James T. McCall
Assistant Examiner—Kenneth J. Dorner
Attorney—Warren F. B. Lindsley

[57] ABSTRACT

A clamp assembly employing a novel fastener mounted on a band for coacting in an improved manner with perforations extending laterally across the band for facilitating tightening of the band around an object without tearing the peripheries of the perforations.

3 Claims, 5 Drawing Figures

PATENTED JUL 31 1973

3,748,697

INVENTOR.
LOUIE J. MARCHESE
ROBERT A. HILDEBRANDT
BY
ATTORNEY

3,748,697

CLAMP ASSEMBLY FOR HOSE, PIPE AND LIKE ARTICLES

BACKGROUND OF THE INVENTION

This invention relates to a clamp assembly for hose, pipe and like articles and more particularly to an improved clamp assembly for securing a flexible tubing, such as a hose or portion thereof to a more rigid article such as a conduit, pipe, tube or the like.

DESCRIPTION OF THE PRIOR ART

Difficulties have heretofore arisen in the use of clamp assemblies due to the pressures applied to the fastening means of the clamp assemblies. Some of the prior art clamping devices were unable to maintain the necessary clamping pressures without tearing out the usual strap or band perforations employed for engaging with the clamp fastener.

SUMMARY OF THE INVENTION

In accordance with the invention claimed an improved clamp assembly is provided for hose, pipe and like articles fastened together by clamping means where the clamp assembly employs a novel fastener which grips perforations in a pressure applying band around and along the complete periphery of the perforation to prevent tearing of the outline of the perforation under clamping pressures heretofore unattainable.

It is, therefore, one object of this invention to provide an improved clamp assembly which is of a simple yet rugged construction for effectively and tightly clamping a flexible tubing, such as a hose or the like, to another more rigid article.

Another object of this invention is to provide a fastening device which, when used as a hose or pipe clamp, retains two articles together in embracing relationship to uniformly distribute the pressure around the fastening device by interlocking with itself in preformed perforations without tearing the perforations under pressures heretofore unattainable.

A further object of this invention is to provide an improved clamp assembly wherein the desired clamping pressure between cooperating ends of the fastener is obtained by the fastener cooperating more effectively in interlocking arrangement with the outline of engaging perforations in order to distribute the clamping pressures over a substantial portion of the outline of the perforations.

Further objects and advantages of the invention will become apparent as the following description proceeds and the features of novelty which characterize this invention will be pointed out with particularity in the claims annexed to and forming part of this specification.

BRIEF DESCRIPTION OF THE DRAWING

The present invention may be more readily described by reference to the accompanying drawing in which.

DESCRIPTION OF THE PREFERRED EMBODIMENT

Figure 1:
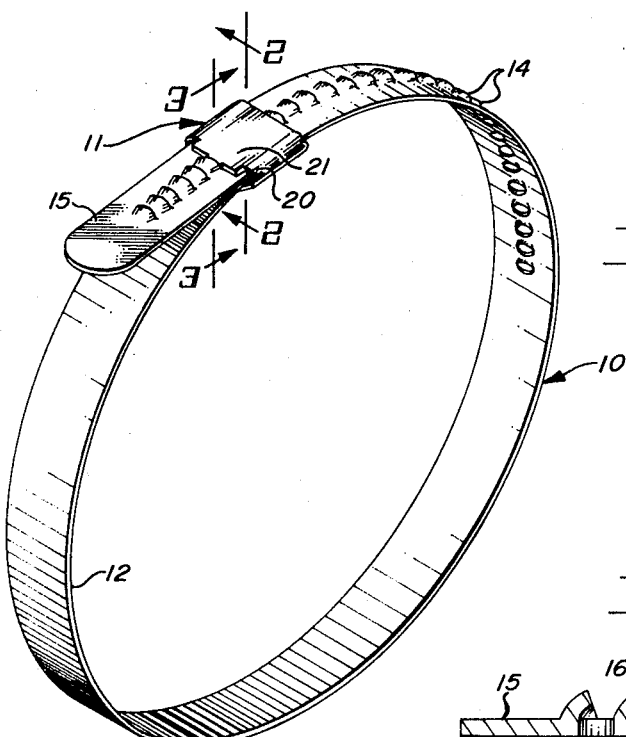
FIG. 1 is a perspective view of a device with a fastener embodying the invention.

Referring more particularly to the drawing by characters of reference, FIGS. 1-4 disclose a clamp assembly 10 having an adjustable clamp or fastener 11 mounted on a strap or flexible band 12 and securely fastened thereto by an actuating tool 13 for tightening and loosening the fastener on the strap.

The flexible band 12 which may be formed of metal or other suitable material is provided with a plurality of equally spaced openings or perforations 14 in one end 15 thereof extending laterally of the longitudinal axis of the band.

In accordance with the invention claimed the perforations are inclined in a direction away from the free end 15 for successive interlocking engagement with a pawl end 16 of fastener 11. The perforations are of a configuration to surround and fit snugly around pawl 16 of fastener 11. In other words, as the pawl end 16 fits into one of the perforations 14 it protrudes into perforation 14 until the shoulder 17 of the pawl engages the periphery of perforation 14, and when so engaged snugly fits into the opening of the perforation. With the shoulder of the pawl at this time tightly engaged with the periphery of the aperture a substantially greater amount of clamping pressure can be applied to the strap because it is applied to the metal all around the perforation rather than at only one point thereon without causing the perforation to rupture.

As noted from the drawing, the pawl end 16 is tapered for ease in inserting it into perforation 14.

Figure 2:
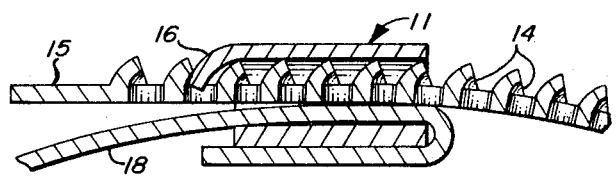
FIG. 2 is an enlarged cross-sectional view of FIG. 1 taken along the line 2—2.
Figure 3:
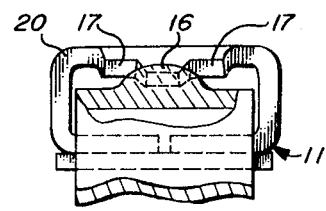
FIG. 3 is an enlarged cross-sectional view of FIG. 1 taken along the line 3—3.
Figure 4:
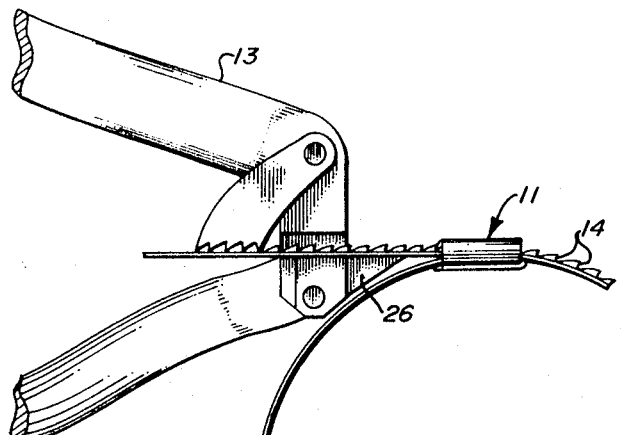
FIG. 4 is a partial view of the device shown in FIG. 1 showing a tool which may be used for tightening the band around a flexible tubing.

As noted from FIGS. 2 and 3, the other end 18 of band 12 is turned back on itself to form a U-shaped configuration.

Fastener 11 is formed to surround band 12 and comprises a briding body portion, the ends of which are bent back upon themselves to approach each other to form a rectangular opening of a size a little larger than the cross section of band 12 so that it may be slid over the band.

One side 20 of the fastener is provided with a protrusion 21 extending substantially perpendicular thereto and terminates in the shoulder 17 from which the pawl end 16 extends. The fastener is mounted on the band such that it fits into the U-shaped configuration at end 18 of the band with the pawl end 16 extending in a direction toward the tongue or end 15 of the band.

The fastener may be formed around the band by placing it across the band and bending its free ends back upon themselves underneath the band, or it may be preformed and inserted over the tongue end of the band and the band's end 18 folded back upon itself to hold the fastener on the band and the tongue inserted in the fastener in a normal clamping direction.

It should be noted from the drawing that the perforations are serrated outwardly to provide along a portion of the periphery of each perforation a tooth-like protrusion. The protrusions are preferably inclined in a direction away from the free end of the tongue or end 15 for successive interlocking engagement with the pawl end 16 of the fastener.

Thus, upon forming the fastener around end 18 of the band the tongue end 15 and the forwardmost of the tooth-like perforations 14 pass under the pawl end 16, since the tongue end of the band can be bent downwardly away from the pawl end 16 of the fastener to avoid a clamping action of the fastener.

To achieve a final clamping position of the clamp assembly 10 additional pressure may be applied to the tongue end 15 of the band by inserting a suitable lever mechanism for the tool 13 through one or more of the perforations 14, which mechanism is provided with a lever arm 26 for engaging the under side of the fastener to force it in clamp tightening direction upon picotal movement of lever mechanism. This leverage action applied to the tongue end of the band draws the tongue end in a circumferential tensioning relationship about the hose or pipe, causing the perforations at the end of the band to cam over and move beyond the endmost tooth-like perforations 14. Due to the resiliency of the band, the band may be securely locked to pawl end 16 of the fastener by merely raising the tongue end 15 upwardly to seat the pawl end in the chosen perforation. Hence it can be seen that the engagement of the pawl end might be with any one of the tooth-like projections 14, depending upon the degree of tension applied to the article being clamped.

Circumferential tensioning of the clamp assembly causes the material of the object being clamped to be compressed radially inwardly, which sets up a diametrically opposed counteractive force to oppose such tensioning. This counteractive force is directed against the confronting under surface of the fastener 11, resulting in the automatic upwardly pivoting of the end 18 of the band to more firmly seat the perforation 14 around the pawl end 6.

It should be recognized that because of the shoulder on the base of pawl end 16, that the force on the band is applied all around the opening formed by the perforation 14, thereby substantially increasing the force capable of being applied to the walls of the perforation without tearing or rupturing it.

Figure 5:
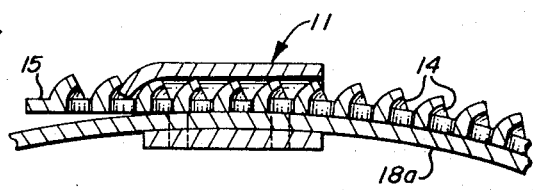
FIG. 5 is an enlarged cross-sectional view of a modification of the clamping device shown in FIGS. 1-4.

FIG. 5 is a modification of the band structure shown in FIGS. 1-4 wherein the end 18a of the band is not bent over onto itself as shown in FIG. 2. It thereby forms a tab serving as a ramp to feed into the fastener the tongue end 15 of the band.

Although but two embodiments of the present invention have been illustrated and described, it will be apparent to those skilled in the art that various changes and modifications may be made therein without departing from the spirit of the invention or from the scope of the appended claims.

What is claimed is:

1. A clamp comprising:
   a metal strip bent into a substantially circular form and having its ends overlapping,
   the outside end having a plurality of spaced notches, the periphery of which form outwardly projecting tooth-like surfaces,
   a raised bridge-like fastener surrounding the overlapping ends of said strip,
   said fastener being formed to allow passage therethrough of the tooth-like surfaces of said strip upon insertion of said outside end therethrough,
   a projection carried by said fastener and spaced to extend within said passage so as to lie generally in the same cylindrical surface as said strip,
   said projection defining a shoulder having a pawl extending outwardly therefrom,
   said projection adapted for inward pivotal movement for interlocking coacting engagement with selective of said notches upon tightening of said strip,
   said pawl penetrating into said notches until said shoulder engages the periphery of said notches and held therein by the expansion of a clamped article.

2. The clamp set forth in claim 1 wherein said notches are formed to snugly fit the circumference of said pawl adjacent said shoulder.

3. The clamp set forth in claim 1 wherein:
   the inner end of said strap is reversely bent onto itself to provide a U-shape opening disposed to receive a part of said fastener,
   said fastener being firmly positioned against the crest of said U-shaped opening during a strip tightening operation.

* * * * *